United States Patent
Allan

(10) Patent No.: US 6,655,857 B2
(45) Date of Patent: Dec. 2, 2003

(54) COMPOSITE OPTICAL WAVEGUIDE FIBER

(75) Inventor: Douglas C. Allan, Corning, NY (US)

(73) Assignee: Corning Incorporated, Corning, NY (US)

( * ) Notice: Subject to any disclaimer, the term of this patent is extended or adjusted under 35 U.S.C. 154(b) by 78 days.

(21) Appl. No.: 09/966,940

(22) Filed: Sep. 28, 2001

(65) Prior Publication Data

US 2003/0063874 A1 Apr. 3, 2003

(51) Int. Cl.[7] ................................................ G02B 6/30
(52) U.S. Cl. .......................................... 385/96; 385/50
(58) Field of Search .............................. 385/96–99, 42, 385/46–49, 50; 430/96, 321, 330

(56) References Cited

U.S. PATENT DOCUMENTS

| | | | |
|---|---|---|---|
| 4,220,394 A | 9/1980 | Tardy | 350/96 |
| 4,268,112 A | 5/1981 | Peterson | 350/96 |
| 4,634,214 A | 1/1987 | Cannon et al. | 350/96.2 |
| 4,701,011 A | 10/1987 | Emkey et al. | 350/96.18 |
| 4,807,954 A | 2/1989 | Oyamada et al. | 350/96 |
| 4,962,988 A | 10/1990 | Swann | 350/96 |
| 6,217,698 B1 | 4/2001 | Walters et al. | 156/272.8 |
| 6,244,757 B1 * | 6/2001 | Kim et al. | 385/96 |
| 6,314,219 B1 * | 11/2001 | Zhang et al. | 385/32 |

* cited by examiner

Primary Examiner—Frank G. Font
Assistant Examiner—Michael P. Mooney
(74) Attorney, Agent, or Firm—Eric M. Smith; James V. Suggs

(57) ABSTRACT

The present invention includes a composite optical waveguide fiber. The composite optical waveguide fiber includes a first optical waveguide fiber. The first optical waveguide fiber has a first diameter and a first outermost layer having a first coefficient of thermal expansion. The composite optical waveguide fiber further includes a second optical waveguide fiber coupled to the first optical waveguide fiber. The second optical waveguide fiber has a second diameter and a second outermost layer, the second outermost layer having a second coefficient of thermal expansion. Wherein the first coefficient of thermal expansion is greater than the second coefficient of thermal expansion. Wherein the first diameter is greater than the second diameter.

23 Claims, 1 Drawing Sheet

Peak stress vs. diameter ratio

COMPOSITE OPTICAL WAVEGUIDE FIBER

BACKGROUND OF THE INVENTION

1. Field of the Invention

The present invention relates generally to a composite optical waveguide fiber, and particularly to the fusion splicing of cylindrical glass bodies having different coefficients of thermal expansion.

2. Technical Background

The technological advancement of optical communication systems has resulted in the development of specialty optical waveguide fibers that may provide a number of signal conditioning mechanisms such as, for example amplification of the optical signal, dispersion compensation and gain flattening. In order to be incorporated into optical communication systems, these specialty fibers must be coupled to fiber pigtails or directly to optical waveguide transmission fibers. These specialty fibers often have chemical compositions that result in thermal expansion characteristics that are quite different from the thermal expansion characteristics of the transmission fibers, such as for example silica optical waveguide fibers (for example SMF-28™ single mode optical waveguide fiber, available from Corning Incorporated of Corning, N. Y., USA) and the optical waveguide fibers used as pigtail fibers.

Often, the deployment of these specialty fibers in optical communication systems requires the coupling of the specialty fibers to transmission fibers. The coupling of optical waveguide fibers to one another is advantageously accomplished by fusion splicing the ends of the fibers together using an electric arc fusion splicer. Conventional wisdom holds that the most efficient fusion splicing occurs when the fibers have the same outer diameter. The difference in thermal expansion characteristics between the specialty fibers and transmission fibers result in weak splices due to high residual stresses when the two fibers have the same diameter, thus there is a need for a low residual stress splice between high thermal expansion specialty fibers and low thermal expansion transmission fibers.

SUMMARY OF THE INVENTION

One aspect of the invention is an optical fiber device which includes a first cylindrical glass body with a first coefficient of thermal expansion, a first diameter, and a first end. The optical fiber device also includes an optical waveguide fiber. The optical waveguide fiber has a second coefficient of thermal expansion, a second diameter, and a second end fusion spliced to the first end. The first diameter is greater than the second diameter, and the first coefficient of thermal expansion is greater than the second coefficient of thermal expansion. The cylindrical glass body is substantially coaxial with at least a longitudinally extending end portion of the optical waveguide fiber.

In another embodiment, the present invention includes a composite optical waveguide fiber. The composite optical waveguide fiber includes a first optical waveguide fiber with a first diameter and a first outermost layer having a first coefficient of thermal expansion. The composite optical waveguide fiber further includes a second optical waveguide fiber coupled to the first optical waveguide fiber. The second optical waveguide fiber has a second diameter and a second outermost layer, the second outermost layer having a second coefficient of thermal expansion. The first coefficient of thermal expansion is greater than the second coefficient of thermal expansion and the first diameter is greater than the second diameter.

In another embodiment, the present invention includes a reduced stress optical waveguide fiber splice. The reduced stress optical waveguide fiber splice includes a first optical waveguide fiber having a first outer layer, a first diameter, a first light guiding core region and a first end. The first outer layer has a first coefficient of thermal expansion. The reduced stress optical waveguide fiber splice further includes a second optical waveguide fiber having a second outer layer, a second diameter, a second light guiding core region and a second end fusion spliced to the first end. The second outer layer has a coefficient of thermal expansion. The first diameter is greater than the second diameter, and the first coefficient of thermal expansion is greater than the second coefficient of thermal expansion. The first light guiding core region and the second light guiding core region are substantially aligned with one another.

One advantage of the present invention is that it has reduced residual stresses resulting from the mismatch in coefficient of thermal expansion of the fusion spliced optical waveguide fibers.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description are merely present embodiments of the invention, and are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention, and together with the description serve to explain the principles and operations of the invention.

DETAILED DESCRIPTION OF THE PREFERRED EMBODIMENTS

Figure 1:
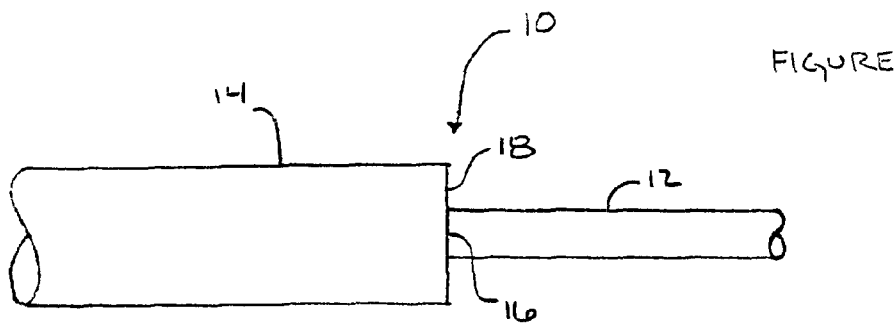
FIG. 1 is a side elevation view of one embodiment of the present invention.

Reference will now be made in detail to the present preferred embodiments of the invention, examples of which are illustrated in the accompanying drawings. Whenever possible, the same reference numerals will be used throughout the drawings to refer to the same or like parts. An embodiment of the optical device of the present invention is shown in FIG. 1, and is designated generally throughout by the reference numeral 10.

As embodied herein and depicted in FIG. 1, the optical device 10 includes an optical waveguide fiber 12, such as, for example a SMF-28™ single mode optical waveguide fiber available from Corning Incorporated of Corning, N. Y., USA and a cylindrical glass body 14. The optical waveguide fiber has a coefficient of thermal expansion that is less than the coefficient of thermal expansion of the cylindrical glass body 14. The optical waveguide fiber 12 includes an end 16. The end 16 is prepared for fusion coupling to an end 18 of the cylindrical glass body 14, using conventional techniques that are within the scope of knowledge of one of ordinary skill in the art of electric arc fusion coupling of glass bodies. Similarly, the end 18 of the cylindrical glass body 14 is prepared for fusion coupling to the end 16 of the optical waveguide fiber 12. The diameter of the glass body 14 is larger than the diameter of the optical waveguide fiber 12. The end 16 of the optical waveguide fiber 12 is fusion coupled to the end 18 of the cylindrical glass body 14 using a commercially available electric arc fusion splicer, such as, for example those produced by Ericsson Network Technologies AB and Furukawa Electric Co., Ltd.

Figure 2:
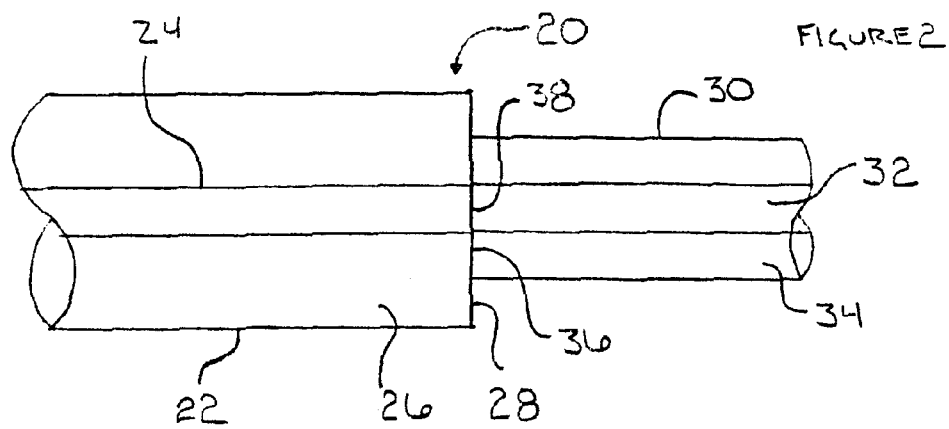
FIG. 2 is a side elevation view of another embodiment of the present invention.

An embodiment of the composite optical waveguide of the present invention is shown in FIG. 2 and is designated generally throughout by the reference numeral 20. As embodied herein and depicted in FIG. 2 the composite optical waveguide fiber 20 includes a first optical waveguide fiber 22. The first optical waveguide fiber 22 is made from glass and includes a first light guiding core region 24 surrounded by an outermost glass layer 26. The first optical waveguide fiber 22 also includes a first end 28. The outermost glass layer 26 possesses a first coefficient of thermal expansion. The first optical waveguide fiber 22 may be for example, an optical waveguide fiber having a outermost glass layer 26 selected from the families of glasses including alkalide silicates; anitmony silicates; antimony germanates; bismuth oxide based glasses; borosilicates; calcium aluminates; fluoride glasses including fluorozircanates, fluoroaluminates, fluorogallates and fluoroindates; phosphorous doped silicates;sulfide glasses including: gallium based sulfide glasses, arsenic based sulfide glasses and germania based sulfide glasses; and tellurites. Alternatively, the outermost layer of the first optical fiber 22 may be a transparent glass-ceramic material.

An example of an antimony silicate glass is one having a chemical composition in mole percent of 77% $SiO_2$, 2% $Al_2F_6$, and 21% $Sb_2O_3$ and a coefficient of thermal expansion of about $66 \times 10^{-7}$ per °C. An example of a calcium aluminate glass is one having a chemical composition in mole percent of 40% $Al_2O_3$, and 60% CaO and a coefficient of thermal expansion of about $90 \times 10^{-7}$ per °C. An example of a tellurite glass is one having a chemical composition in mole percent of 75% $TeO_2$, 20% ZnO, and 5% NaO and a coefficient of thermal expansion of about $180 \times 10^{-7}$ per °C.

The composite optical waveguide fiber 20 also includes a second optical waveguide fiber 30. The second optical waveguide fiber 30 is made from glass and includes a second light guiding core region 32 surrounded by a second outermost glass layer 34. The second optical waveguide fiber 30 also includes a second end 36. The second optical waveguide fiber 30 possesses a second coefficient of thermal expansion. The second coefficient of thermal expansion is less than the first coefficient of thermal expansion. The outermost layer of the second optical fiber waveguide 30 may for example be a layer of silica ($SiO_2$) glass.

The first and second ends 28, 36 are prepared in accordance with a conventional splicing preparation procedure, such as, for example, stripping of any protective coating and cleaving. The first and second optical waveguide fibers 22, 30 are aligned with one another such that the first and second light guiding cores 24, 32 are aligned with one another so as to permit optical signals to propagate across the interface 38 of the first and second light guiding cores 24, 32.

The first and second optical waveguide fibers 22, 30 are fusion spliced to one another using an electric arc fusion splicer, such as, for example an Ericsson FSU 995 available from Amherst FiberOptics of Brentwood, Tenn., USA. The settings for the splicer will depend upon the diameters and composition of the first and second optical waveguide fibers 22, 30 and are readily ascertainable by one of ordinary skill in the art of electric arc fusion splicing of optical fibers.

Figure 3:
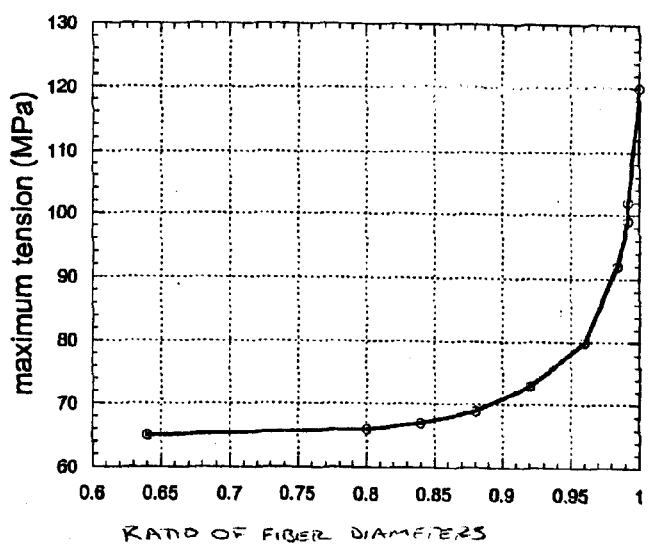
FIG. 3 is a graph showing the peak stress as a function of fiber diameter ratios for a silica fiber to a specialty fiber.

FIG. 3 is a graph illustrating the relationship between the ratio of the fiber diameters and the peak stress in the splice for a specialty fiber having a Young's Modulus of 45.6 MPa, a Poisson ratio of 0.182 and a coefficient of thermal expansion of $70 \times 10^{-7}$ per °C. and a silica fiber having a Young's Modulus of 72.59 MPa, a Poisson ratio of 0.158 and a coefficient of thermal expansion of $6.4 \times 10^{-7}$ per °C. In accordance with the present invention the specialty fiber has the larger diameter, for example, for diameter ratio of 0.7 when the silica fiber has a diameter of 125 $\mu$m the specialty fiber will have a diameter of about 178.6 $\mu$m.

It will be apparent to those skilled in the art that various modifications and variations can be made to the present invention without departing from the spirit and scope of the invention. Thus it is intended that the present invention cover the modifications and variations of this invention provided they come within the scope of the appended claims and their equivalents.

What is claimed is:

1. An optical fiber device comprising:
   a cylindrical glass body having:
      a first coefficient of thermal expansion;
      a first diameter; and
      a first end;
   an optical waveguide fiber having:
      a second coefficient of thermal expansion;
      a second diameter; and
      a second end fusion spliced to said first end;
   wherein said first diameter is greater than said second diameter;
   wherein said first coefficient of thermal expansion is greater than said second coefficient of thermal expansion; and
   wherein said cylindrical glass body is substantially coaxial with at least a longitudinally extending end portion of said optical waveguide fiber.

2. A composite optical waveguide fiber comprising:
   a first optical waveguide fiber, having a first diameter and a first outermost layer having a first coefficient of thermal expansion; and
   a second optical waveguide fiber coupled to said first optical waveguide fiber, said second optical waveguide fiber having a second diameter and a second outermost layer, said second outermost layer having a second coefficient of thermal expansion and;
   wherein said first coefficient of thermal expansion is greater than said second coefficient of thermal expansion; and
   wherein said first diameter is greater than said second diameter.

3. The composite optical waveguide fiber of claim 2 wherein the ratio of said second diameter to said first diameter is less than about 0.95.

4. The composite optical waveguide fiber of claim 2 wherein the ratio of said second diameter to said first diameter is less than about 0.90.

5. The composite optical waveguide fiber of claim 2 wherein the ratio of said second diameter to said first diameter is less than about 0.80.

6. The composite waveguide of claim 2 wherein said second outermost layer comprises a layer of $SiO_2$.

7. The composite waveguide of claim 6 wherein said first outermost layer comprises a layer of a transparent glass-ceramic.

8. The composite waveguide of claim 6 wherein said first outermost layer comprises a layer of glass selected from the families of glasses including alkalide silicates; anitmony silicates; antimony germanates; bismuth oxide based glasses; borosilicates; calcium aluminates; fluoride glasses including fluorozircanates, fluoroaluminates, fluorogallates and fluoroindates; phosphorous doped silicates; sulfide glasses including: gallium based sulfide glasses, arsenic based sulfide glasses and germania based sulfide glasses; and tellurites.

9. A reduced stress optical waveguide fiber splice comprising:
   a first optical waveguide fiber, having:
      a first outer layer, said first outer layer having a first coefficient of thermal expansion;
      a first diameter;
      a first light guiding core region; and
      a first end;
   a second optical waveguide fiber, having:
      a second outer layer, said second outer layer having a second coefficient of thermal expansion;
      a second diameter;
      a second light guiding core region; and
      a second end fusion spliced to said first end;
   wherein said first diameter is greater than said second diameter;
   wherein said first coefficient of thermal expansion is greater than said second coefficient of thermal expansion; and
   wherein said first light guiding core region and said second light guiding core region are substantially aligned with one another.

10. The reduced stress optical waveguide fiber splice of claim 9, wherein said first coefficient of thermal expansion is greater than $60 \times 10^{-7}$ per °C.

11. The reduced stress optical waveguide fiber splice of claim 10, wherein said second coefficient of thermal expansion is less than $10 \times 10^{-7}$ per °C.

12. The reduced stress optical waveguide fiber splice of claim 9, wherein the ratio of said first coefficient of thermal expansion to said second coefficient of thermal expansion is greater than about 6.

13. The reduced stress optical waveguide fiber splice of claim 12, wherein the ratio of said first coefficient of thermal expansion to said second coefficient of thermal expansion is less than about 30.

14. The reduced stress optical waveguide fiber splice of claim 9, wherein the ratio of said second diameter to said first diameter is greater than about 0.60.

15. The reduced stress optical waveguide fiber splice of claim 14, wherein the ratio of said second diameter to said first diameter is less than about 0.99.

16. The reduced stress optical waveguide fiber splice of claim 15, wherein the ratio of said second diameter to said first diameter is less than about 0.90.

17. The reduced stress optical waveguide fiber splice of claim 9, wherein the residual stress in the fusion splice due to the difference between said first coefficient of thermal expansion and said second coefficient of thermal expansion is less than about 118 MPa.

18. The reduced stress optical waveguide fiber splice of claim 17, wherein the residual stress in the fusion splice due to the difference between said first coefficient of thermal expansion and said second coefficient of thermal expansion is less than about 110 MPa.

19. The reduced stress optical waveguide fiber splice of claim 18, wherein the residual stress in the fusion splice due to the difference between said first coefficient of thermal expansion and said second coefficient of thermal expansion is less than about 100 MPa.

20. The reduced stress optical waveguide fiber splice of claim 19, wherein the residual stress in the fusion splice due to the difference between said first coefficient of thermal expansion and said second coefficient of thermal expansion is less than about 90 MPa.

21. The reduced stress optical waveguide fiber splice of claim 20, wherein the residual stress in the fusion splice due to the difference between said first coefficient of thermal expansion and said second coefficient of thermal expansion is less than about 80 MPa.

22. The reduced stress optical waveguide fiber splice of claim 21, wherein the residual stress in the fusion splice due to the difference between said first coefficient of thermal expansion and said second coefficient of thermal expansion is less than about 70 MPa.

23. The reduced stress optical waveguide fiber splice of claim 9,
   wherein said first coefficient of thermal expansion is about $70 \times 10^{-7}$ per °C.;
   wherein said second coefficient of thermal expansion is about $6.4 \times 10^{-7}$ per °C.; and
   wherein the ratio of said second diameter to said first diameter is less than about 0.90.

* * * * *